(12) United States Patent
Chang

(10) Patent No.: US 10,797,597 B1
(45) Date of Patent: Oct. 6, 2020

(54) TRANSIENT ENHANCING CIRCUIT AND CONSTANT-ON-TIME CONVERTER USING THE SAME

(71) Applicant: ELITE SEMICONDUCTOR MEMORY TECHNOLOGY INC., Hsinchu (TW)

(72) Inventor: Yao-Ren Chang, Zhunan Township (TW)

(73) Assignee: ELITE SEMICONDUCTOR MEMORY TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/550,522

(22) Filed: Aug. 26, 2019

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 9,093,910 B1 * | 7/2015 | Ankamreddi | H02M 3/33523 |
| 9,276,477 B2 | 3/2016 | Thomas et al. | |
| 9,444,338 B1 * | 9/2016 | Pastorina | G05F 1/10 |
| 9,571,043 B1 | 2/2017 | Lum et al. | |
| 9,991,775 B1 | 6/2018 | Lin et al. | |
| 2004/0120094 A1 * | 6/2004 | Satoh | H02M 3/156 361/160 |
| 2008/0061757 A1 * | 3/2008 | Khayat | H02M 3/157 323/283 |
| 2014/0347021 A1 * | 11/2014 | Mednik | H02M 3/156 323/235 |
| 2016/0011613 A1 * | 1/2016 | Xu | H02M 3/156 323/280 |
| 2019/0013733 A1 * | 1/2019 | Trichy | H02M 3/158 |

* cited by examiner

*Primary Examiner* — Jeffrey A Gblende
(74) *Attorney, Agent, or Firm* — Schmeiser, Olsen & Watts, LLP

(57) ABSTRACT

The present application proposes a transient enhancing circuit for a constant-on-time converter. The constant-on-time converter includes an error amplifier and a comparator. The transient enhancing circuit includes a first sample-and-hold circuit and a zero-current detection circuit. The first sample-and-hold circuit has an input terminal and an output terminal. The input terminal of the first sample-and-hold circuit is coupled to an output terminal of the error amplifier, and the output terminal of the first sample-and-hold circuit is coupled to a first input terminal of the comparator. The zero-current detection circuit is coupled to the first sample-and-hold circuit and arranged for outputting a control signal when current flowing through a load of the constant-on-time converter is detected to be zero. The present application also proposes a constant-on-time converter using the transient enhancing circuit.

18 Claims, 9 Drawing Sheets

TRANSIENT ENHANCING CIRCUIT AND CONSTANT-ON-TIME CONVERTER USING THE SAME

BACKGROUND OF THE INVENTION

1. Field of the Invention

The present invention relates to an electronic circuit for a constant-on-time converter and, more particularly, to an electronic circuit capable of enhancing load transient for the constant-on-time converter.

2. Description of the Related Art

A buck converter (or step-down converter) is a DC-to-DC power converter which steps down voltage from its input (supply) to its output (load). Regardless of their control modes, as shown in FIG. 1, a step-down converter consists of three elements: a pulse-modulator that generates pulse sequences of its input voltage as a high level, and the ground voltage as low-level signals; an LC filter that averages out the pulse sequence from the pulse-modulator; and a feedback and loop-compensation that generates a control signal, VC, by comparing its output voltage with its internal reference voltage, usually via an error amplifier. The pulse-modulator will feed forward the input voltage $V_{IN}$ as a pulse sequence. The LC filter will convert the pulse sequence from this pulse-modulator to a proper output voltage.

In FIG. 1, the LC filter averages the high/low density of the $V_{SW}$, and thus resulting a substantially regulated output voltage $V_{OUT}$. When using pulse-width modulation (PWM) control in voltage-mode (VM) or current-mode (CM), this density is called duty cycle of the PWM. The relationship between the input voltage $V_{IN}$ and the output voltage $V_{OUT}$ can be roughly described by an equation: $D \times V_{IN} = V_{OUT}$ (1), where D is the duty cycle of the PWM.

In addition, to make a step-down converter work, it is essential to maintain the switching frequency, $F_{SW}$, well above the cutoff frequency point of its LC filter, $F_{LC}$. Otherwise, the pulse sequence is not well averaged, which results in a huge ripple waveform at the output voltage $V_{OUT}$.

In the system of FIG. 1, when a load current $I_{OUT}$ value changes (in the load of FIG. 3), a perturbation of the output voltage $V_{OUT}$ is generated, which is usually called load transient. As shown in FIG. 2, when $I_{OUT}$ increases, $V_{OUT}$ will temporarily drops and then rises back up. On the other hand, when $I_{OUT}$ decreases, $V_{OUT}$ will temporarily rises up and then drops back down.

BRIEF SUMMARY OF THE INVENTION

As known from above, when a constant-on-time converter is connected to a light load, the loading current is small, which cannot efficiently release the energy stored in the LC filter. Therefore, the output voltage $V_{OUT}$ will slightly elevated. This slightly elevated $V_{OUT}$ will be feed back to the error amplifier of the feedback and loop-compensation of the constant-on-time converter. If the feedback voltage is higher than the reference voltage, the output voltage of the error amplifier will drop such that the output voltage $V_{OUT}$ will drop back to its original level. This perturbation particularly affects the load transient when the load of the constant-on-time converter increases from very low to high, due to the "extra" time required for the output voltage $V_{OUT}$ to recover.

It is therefore an object of the present invention is to provide a transient enhancing circuit and a constant-on-time converter using such that the load transient can be enhanced when a load of the constant-on-time converter increases from very low to high.

To achieve the above object, according to one aspect of the present invention a transient enhancing circuit for a constant-on-time converter is proposed. The constant-on-time converter includes an error amplifier and a comparator. The transient enhancing circuit includes a first sample-and-hold circuit and a zero-current detection circuit. The first sample-and-hold circuit has an input terminal and an output terminal. The input terminal of the first sample-and-hold circuit is coupled to an output terminal of the error amplifier, and the output terminal of the first sample-and-hold circuit is coupled to a first input terminal of the comparator. The zero-current detection circuit is coupled to the first sample-and-hold circuit and arranged for outputting a control signal when current flowing through a load of the constant-on-time converter is detected to be zero.

In the transient enhancing circuit according to the above embodiment, the transient enhancing circuit further includes a second sample-and-hold circuit and a clamping circuit. The second sample-and-hold circuit has an input terminal and an output terminal. The input terminal of the second sample-and-hold circuit is coupled to the output terminal of the first sample-and-hold circuit, and the output terminal of the second sample-and-hold circuit is coupled to the first input terminal of the comparator. The clamping circuit is coupled between the output terminal of the second sample-and-hold circuit and the ground. The zero-current detection circuit is also coupled to second sample-and-hold circuit.

In the transient enhancing circuit according to either of the above embodiments, the first sample-and-hold circuit includes a first switch and a first capacitor. The first switch is coupled between the input terminal and the output terminal of the first sample-and-hold circuit. The first capacitor is coupled between the input terminal of the first sample-and-hold circuit and the ground. The first switch is opened in response to the control signal during each duty cycle.

In the transient enhancing circuit according to either of the above embodiments, the first sample-and-hold circuit is arranged to hold a sampled voltage level of an error voltage outputted from the error amplifier in response to the control signal.

In the transient enhancing circuit according to either of the above embodiments, the second sample-and-hold circuit includes a second switch and a second capacitor. The second switch is coupled between the input terminal and the output terminal of the second sample-and-hold circuit. The second capacitor is coupled between the input terminal of the second sample-and-hold circuit and the ground. The second switch is opened in response to the control signal during each duty cycle In the transient enhancing circuit according to either of the above embodiments, the second sample-and-hold circuit is arranged to hold a sampled voltage level of the error voltage outputted from the error amplifier and then clamped by the clamping circuit in response to the control signal.

In the transient enhancing circuit according to either of the above embodiments, the transient enhancing circuit further includes a differentiator. The differentiator has a first input terminal, a second input terminal and an output terminal, wherein the second input terminal of the differentiator is coupled to the output terminal of the second sample-and-hold circuit, and the output terminal of the differentiator is coupled to the first input terminal of the comparator.

In the transient enhancing circuit according to either of the above embodiments, the clamping circuit includes a plurality of diodes coupled in series.

In the transient enhancing circuit according to either of the above embodiments, the transient enhancing circuit further includes a compensating circuit coupled between the output terminal of the first sample-and-hold circuit and the ground.

In the transient enhancing circuit according to either of the above embodiments, the compensating circuit includes a resistor and a capacitor. The resistor and the capacitor are coupled in series between the output terminal of the first sample-and-hold circuit and the ground.

To achieve the above object, according to another aspect of the present invention a constant-on-time (COT) converter is proposed. The COT converter includes an error amplifier, having a first input terminal, a second input terminal and an output terminal, wherein the second input terminal is coupled to a reference voltage; a comparator, having a first input terminal, a second input terminal and an output terminal; a buck converter, having an input terminal and an output terminal, wherein the output terminal of the buck converter is coupled to the first input terminal of the error amplifier, to the second input terminal of the comparator, and to a load; a constant-on-time controller, coupled between the input terminal of the buck converter and the output terminal of the comparator; and a transient enhancing circuit including: a first sample-and-hold circuit, having an input terminal and an output terminal, wherein the input terminal of the first sample-and-hold circuit is coupled to an output terminal of the error amplifier and the output terminal of the first sample-and-hold circuit is coupled to the first input terminal of the comparator; and a zero-current detection circuit, coupled to the first sample-and-hold circuit, wherein the zero-current detection circuit is arranged for outputting a control signal when current flowing through the load of the constant-on-time converter is detected to be zero.

In the COT converter according to the above embodiment, the COT converter further includes: a second sample-and-hold circuit, having an input terminal and an output terminal, wherein the input terminal of the second sample-and-hold circuit is coupled to the output terminal of the first sample-and-hold circuit, and the output terminal of the first sample-and-hold circuit is coupled to the second input terminal of the comparator; and a clamping circuit, coupled between the output terminal of the second sample-and-hold circuit and the ground, wherein the zero-current detection circuit is coupled to the second sample-and-hold circuit.

In the COT converter according to either of the above embodiments, the first sample-and-hold circuit includes: a first switch, coupled between the input terminal and the output terminal of the first sample-and-hold circuit; and a first capacitor, coupled between the output terminal of the first sample-and-hold circuit and the ground, wherein the first switch is opened in response to the control signal during each duty cycle.

In the method according to either of the above embodiments, the first sample-and-hold circuit is arranged to hold a sampled voltage level of an error voltage outputted from the error amplifier in response to the control signal.

In the COT converter according to either of the above embodiments, the second sample-and-hold circuit includes a second switch, coupled between the input terminal and the output terminal of the second sample-and-hold circuit; and a second capacitor, coupled between the input terminal of the second sample-and-hold circuit and the ground, wherein the second switch is opened in response to the control signal during each duty cycle.

In the COT converter according to either of the above embodiments, the second sample-and-hold circuit is arranged to hold a sampled voltage level of the error voltage outputted from the error amplifier and then clamped by the clamping circuit in response to the control signal.

In the COT converter according to either of the above embodiments, the clamping circuit includes a plurality of diodes, coupled in series.

In the COT converter according to either of the above embodiments, the COT converter further includes a compensating circuit, coupled between the output terminal of the first sample-and-hold circuit and the ground.

In the COT converter according to either of the above embodiments, the compensating circuit includes a resistor and a capacitor coupled in series between the output terminal of the first sample-and-hold circuit and the ground.

In the COT converter according to either of the above embodiments, the COT converter further includes a differentiator. The differentiator has a first input terminal, a second input terminal and an output terminal. The second input terminal of the differentiator is coupled to the output terminal of the second sample-and-hold circuit, and the output terminal of the differentiator is coupled to the first input terminal of the comparator.

With these arrangements, the transient enhancing circuit and the COT converter using the same can sample and hold a voltage level outputted by the error amplifier when the load is low during a duty cycle, i.e. preventing the output voltage of the COT converter dropping to much, and hence enhancing the load transient when the load increases.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of non-transitory computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

The present invention will now be described with some preferred embodiments thereof and by referring to the accompanying drawings.

Figure 1:
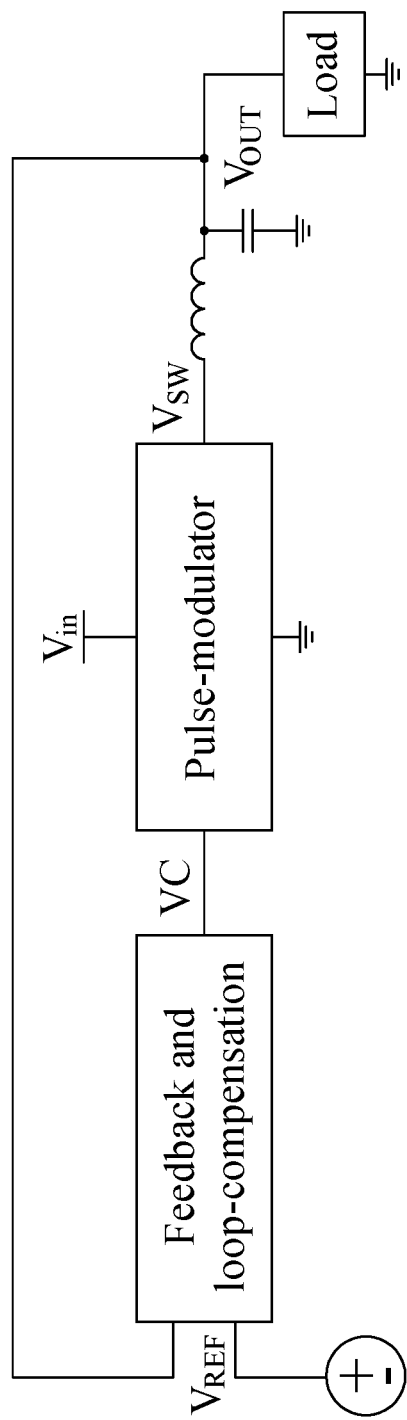
FIG. 1 is a block diagram of a circuit structure of a traditional step-down converter.
Figure 2:
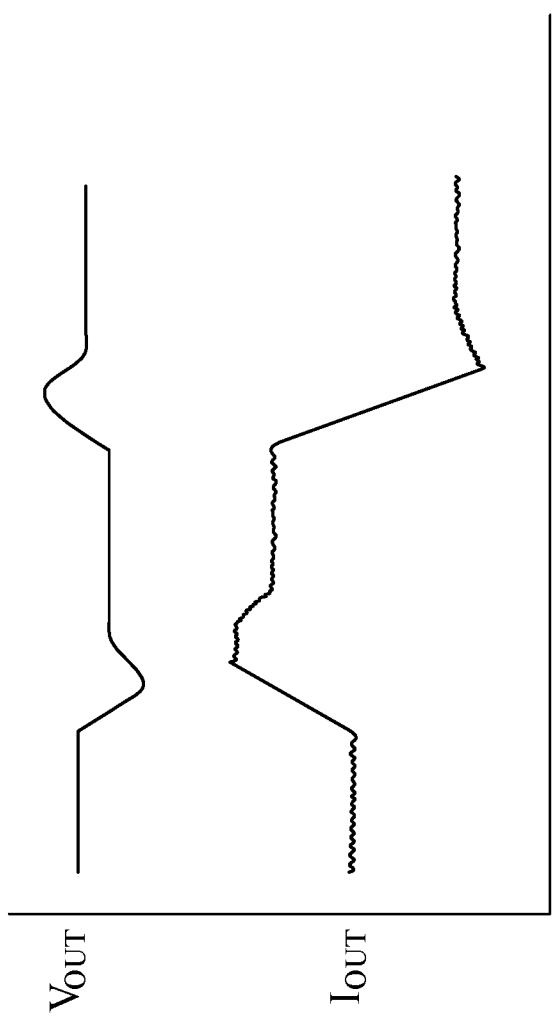
FIG. 2 is a transient plot of the step-down converter of FIG. 1 regarding its load current and output voltage.
Figure 3:
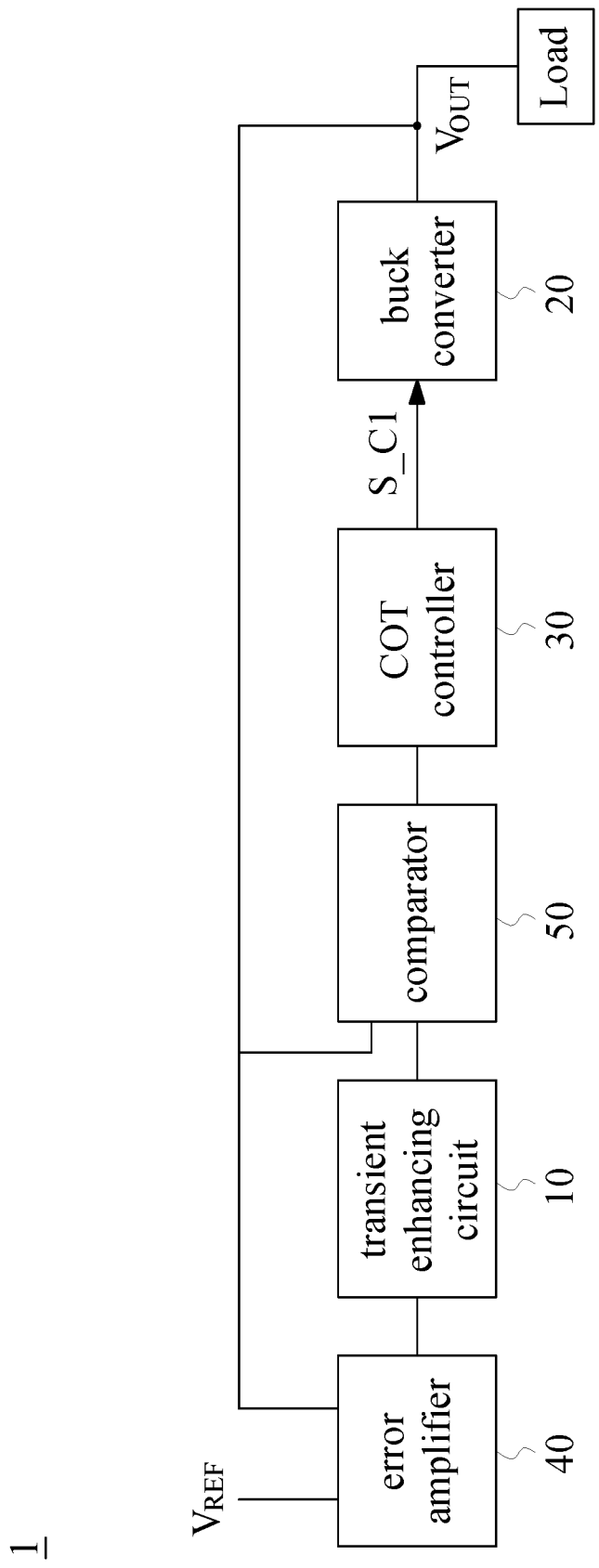
FIG. 3 is a block diagram of a constant-on-time (COT) converter 1 according to an embodiment of the present invention.

Please refer to FIG. 3 which illustrating a block diagram of a constant-on-time (COT) converter 1 according to an embodiment of the present invention. The COT converter 1 includes a transient enhancing circuit 10, a buck converter 20, a COT controller 30, an error amplifier 40 and a comparator 50. The comparator 50 has a first input terminal, a second input terminal and an output terminal. The COT controller 30 is coupled to the buck converter 20. The buck converter 20 is coupled to a load, the error amplifier 40 and the second input terminal of the comparator 50. The error amplifier 40 is couple to the transient enhancing circuit 10. The transient enhancing circuit 10 is coupled to the first input terminal of the comparator 50. The output terminal of the comparator 50 is coupled to the COT controller 30.

The COT controller 30 controls the buck converter 20 via a first control signal S_C1. The buck converter 20 is coupled to the error amplifier 40 in order to provide a feedback path for the COT converter 1, where an output voltage $V_{OUT}$, i.e. the stepped-down voltage, of buck converter 20 is feed into the error amplifier 40 and compared with a reference voltage $V_{REF}$, which is a precise internal reference target voltage. The result of the comparison is outputted from the error amplifier 40 and then feed back to the COT controller 30 via the transient enhancing circuit 10 and the comparator 50. The COT controller 30 then generates the first control signal S_C1 in response to this feedback.

In detail, the error amplifier 40 has a first input terminal, a second input terminal and an output terminal. The second input terminal is couple to the reference voltage $V_{REF}$. The first input terminal is coupled to the buck converter 20 in order to receive the output voltage $V_{OUT}$, or a scaled down version of the output voltage $V_{OUT}$ through a resistive voltage divider. It is not meant to be a limitation of the present invention. Users should be able to choose either circuitry design depending on actual application requirements. The error amplifier 40 then compares the feedback voltage and the reference voltage $V_{REF}$ and accordingly outputs a voltage level via the output terminal to the transient enhancing circuit 10. When the feedback voltage is higher than the reference voltage $V_{REF}$, the outputted voltage level will decrease.

Figure 4:
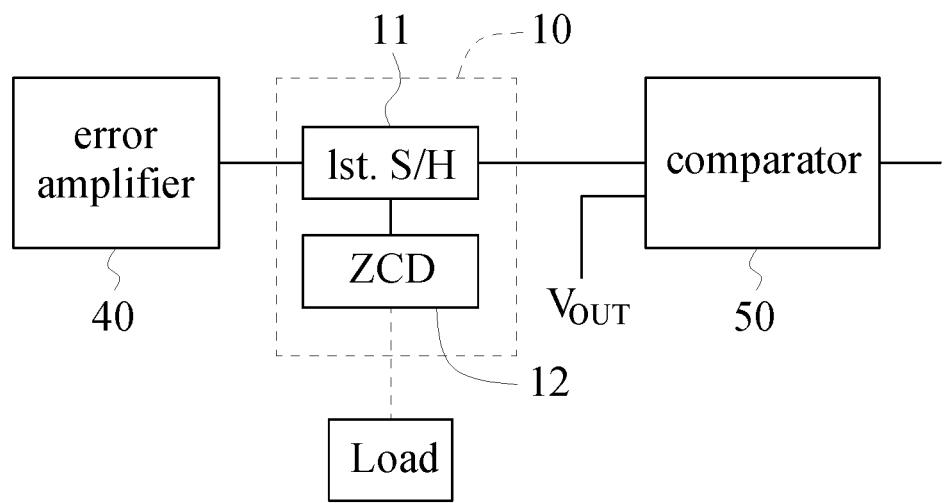
FIG. 4 is a block diagram of the transient enhancing circuit according to an embodiment of the present invention.

Please refer to FIG. 4, which illustrating a block diagram of the transient enhancing circuit according to an embodiment of the present invention. In the embodiment, the transient enhancing circuit 10 includes a first sample-and-hold circuit 11 and a zero-current detection circuit 12. The first sample-and-hold circuit 11 has an input terminal and an output terminal. The input terminal of the first sample-and-hold circuit 11 is coupled to the output terminal of the error amplifier 40, and the output terminal of the first sample-and-hold circuit 11 is coupled to the first input terminal of the comparator 50. The zero-current detection circuit 12 is also coupled to the first sample-and-hold circuit 11. The zero-current detection circuit 12 is arranged for outputting a second control signal S_C2 to the first sample-and-hold circuit 11 when current flowing through the load coupled to the COT converter 1 is detected to be zero, i.e. the load coupled to the COT converter 1 is very low or there is no load coupled to the COT converter 1. When the first sample-and-hold circuit 11 receives the second control signal S_C2, the first sample-and-hold circuit 11 will sample and hold a voltage level outputted from the error amplifier 40 and feed the hold voltage forward to the comparator 50. In this way, when the load coupled to the COT converter 1 is low, the feedback voltage increases, and the voltage outputted from the error amplifier 40 decreases, the first sample-and-hold circuit 11 can keep the voltage level outputted from the error amplifier 40 at a relative high position before it continues to drop further, and the hold voltage is then feed forward to the first input terminal of the comparator 50. As a result, during the next duty cycle, if a load transient happens, i.e. the load coupled to the COT converter 1 becomes high, the load transient period will be shortened because the low point of the load transient is relatively higher than the one that happens without the first sample-and-hold circuit 11 during previous duty cycle. In other words, the output voltage $V_{OUT}$ will take less time to rise back up, hence enhancing the load transient.

Figure 5:
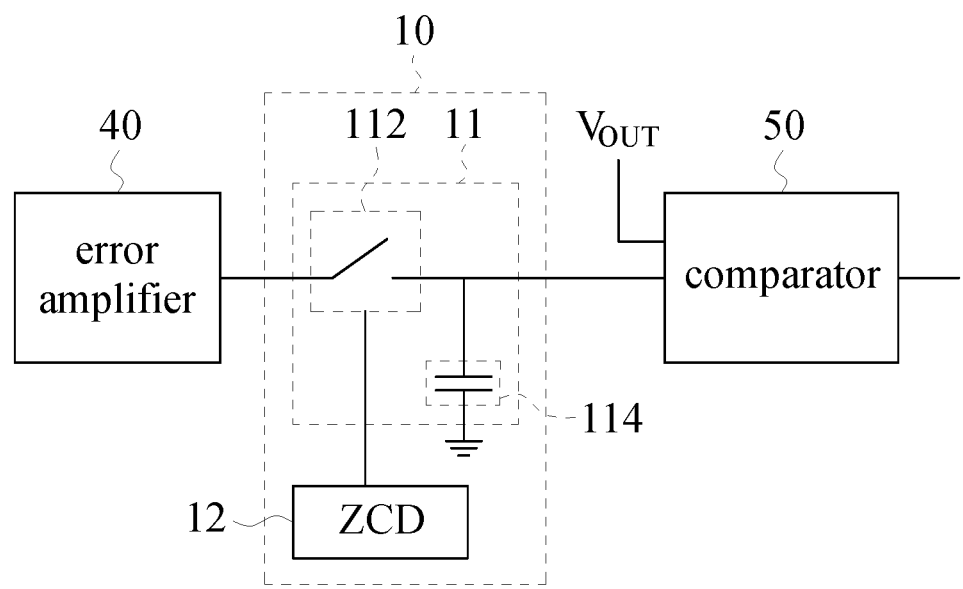
FIG. 5 is a block diagram of the transient enhancing circuit according to an embodiment of the present invention.

Please refer to FIG. 5, which illustrating a block diagram of the transient enhancing circuit according to an embodiment of the present invention. In the embodiment, the first sample-and-hold circuit 11 includes a first switch 112 and a first capacitor 114. The first switch 112 is coupled between the input terminal and the output terminal of the first sample-and-hold circuit 11. The first capacitor 114 is coupled between the output terminal of the first sample-and-hold circuit 11 and the ground. The first switch 112 is also coupled to the zero-current detection circuit 12. When the first switch 112 receives the second control signal S_C2, the first switch 112 is opened. Those skilled in the art should readily understand the operations of this embodiment after reading the above paragraphs. Details is omitted here for brevity.

Figure 6:
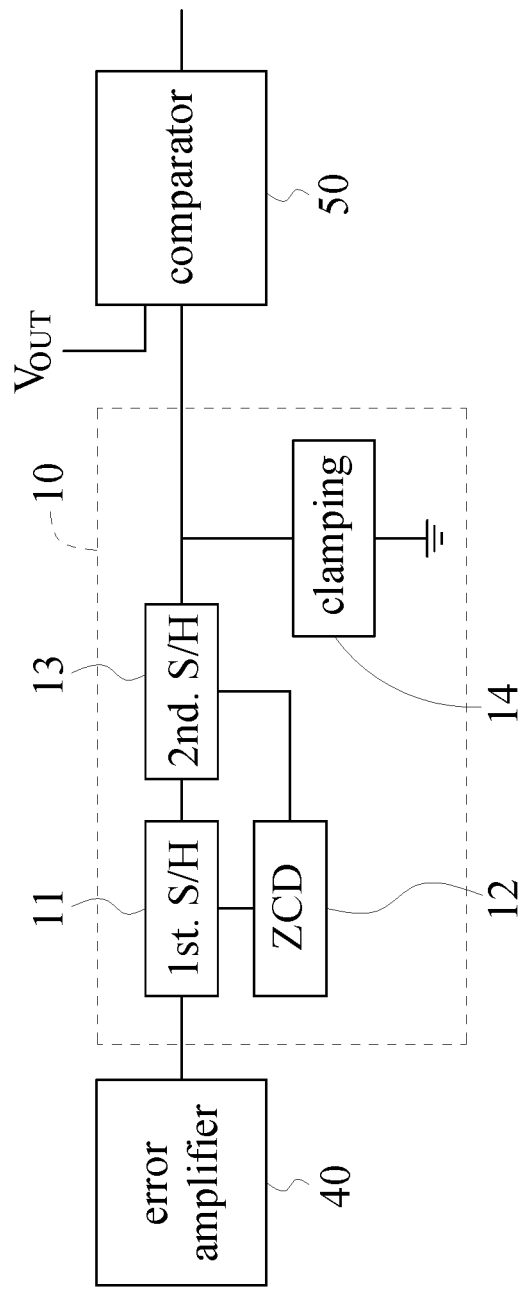
FIG. 6 is a block diagram of the transient enhancing circuit according to another embodiment of the present invention.

Please refer to FIG. 6, which illustrating a block diagram of the transient enhancing circuit according to another embodiment of the present invention. In one embodiment, the transient enhancing circuit 10 further includes a second sample-and-hold circuit 13 and a clamping circuit 14. The second sample-and-hold circuit 13 has an input terminal and an output terminal. The input terminal of the second sample-and-hold circuit 13 is coupled to the output terminal of the first sample-and-hold circuit 11, and the output terminal of the second sample-and-hold circuit 13 is coupled to the first input terminal of the comparator 50. The second sample-and-hold circuit 13 is also coupled to the zero-current detection circuit 12. The operations of the second sample-and-hold circuit 13 is substantially the same as the operations of the first sample-and-hold circuit 11. When the second sample-and-hold circuit 13 receives the second control signal S_C2 from the zero-current detection circuit 12, the second sample-and-hold circuit 13 will sample and hold the voltage outputted from the first sample-and-hold circuit 11 at a relative high level before it continues to drop. The kept voltage level is then feed forward to the first input terminal of the comparator 50. The clamping circuit 14 has a first end and a second end coupled to the output terminal of the second sample-and-hold circuit 13 and the ground, respectively.

The clamping circuit 14 is arranged for keeping the input voltage of the comparator 50 at a certain level in order to prevent the comparator 50 from going into saturation state. However, the voltage level kept by the first sample-and-hold circuit 11 will drops a little due to a minor current drown from the clamping circuit 14. The second sample-and-hold circuit 13 can mitigate such influence by providing a second voltage-holding mechanism, which will further enhance the load transient.

Figure 7:
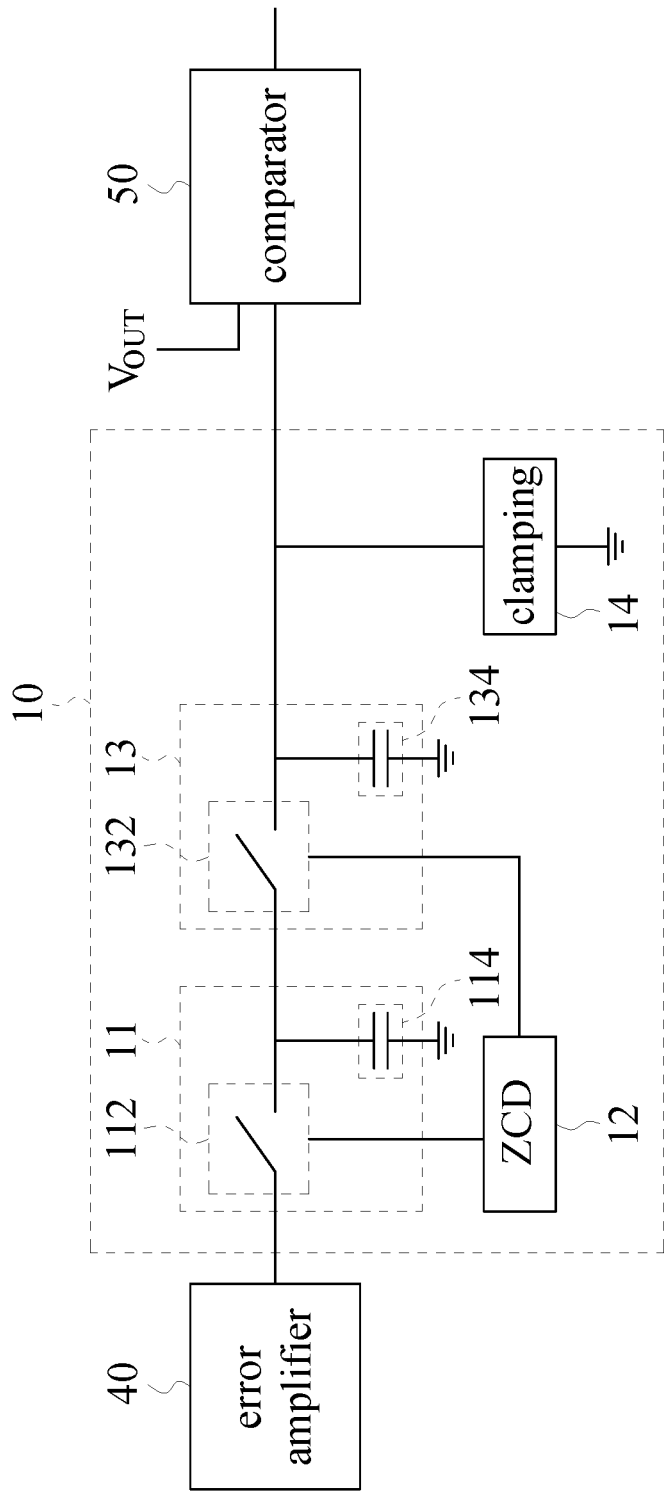
FIG. 7 is a block diagram of the transient enhancing circuit according to another embodiment of the present invention.

Please refer to FIG. 7, which illustrating a block diagram of the transient enhancing circuit according to another embodiment of the present invention. In the embodiment, the second sample-and-hold circuit 13 includes a second switch 132 and a second capacitor 134. The second switch 132 is coupled between the input terminal and the output terminal of second sample-and-hold circuit 13. The second capacitor 134 is coupled between the output terminal of the second sample-and-hold circuit 13 and the ground. The second switch 132 is also coupled to the zero-current detection circuit 12. When the second switch 132 receives the second control signal S_C2, the second switch 132 is opened. Those skilled in the art should readily understand the operations of this embodiment after reading the above paragraphs. Details is omitted here for brevity.

In either the embodiment of FIG. 5 or embodiment of FIG. 6, the clamping circuit 14 can be implemented by coupling a plurality of diodes in series or by coupling a plurality of NMOSs in series with each NMOS has its drain and its gate connected between the first end and second end of the clamping circuit 14.

Figure 8:
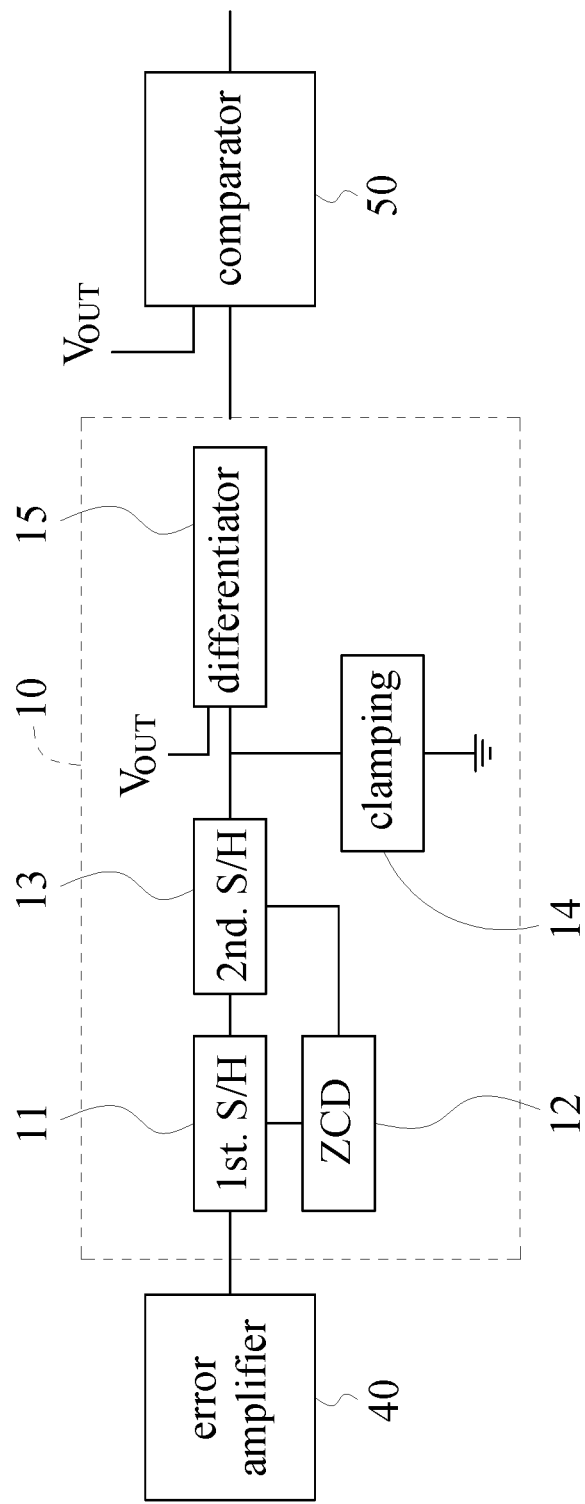
FIG. 8 is a block diagram of the transient enhancing circuit according to yet another embodiment of the present invention.

Please refer to FIG. 8, which illustrating a block diagram of the transient enhancing circuit according to yet another embodiment of the present invention. In the embodiment, the transient enhancing circuit 10 further includes a differentiator 15. The differentiator 15 has a first input terminal, a second input terminal and an output terminal. The first input terminal of the differentiator 15 is coupled to the output terminal of the buck converter 20, the second input terminal of the differentiator 15 is coupled to the output terminal of the second sample-and-hold circuit 13, and the output terminal of the differentiator is coupled to the input terminal of the comparator 50. The differentiator 15 is arranged to further increase the "ripple" of the outputted voltage from the second sample-and-hold circuit 13 before it was feed into the first input terminal of the comparator 50, in order to provide a more distinctive signal.

Figure 9:
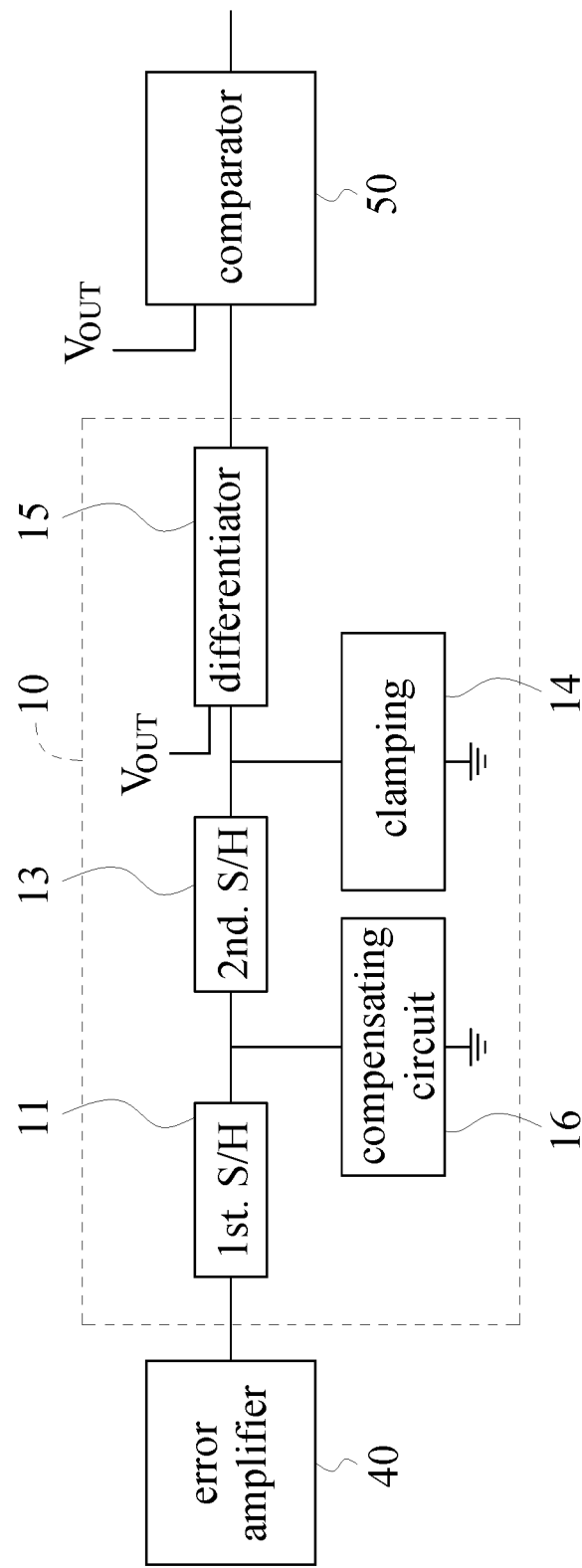
FIG. 9 is a block diagram of the transient enhancing circuit according to yet another embodiment of the present invention.

Please refer to FIG. 9, which illustrating a block diagram of the transient enhancing circuit according to yet another embodiment of the present invention. In the embodiment, the transient enhancing circuit 10 further includes a compensating circuit 16. The compensating circuit 16 is coupled between the output terminal of the first sample-and-hold circuit 11 and the ground. Since the COT converter 1 according to the present invention has a feedback path, it is possible for the COT converter 1 to oscillate, if the not carefully designed. The compensating circuit 16 is arranged to provide a phase compensation to the COT converter 1 in order to prevent the COT converter 1 from generating oscillation.

Figure 10:
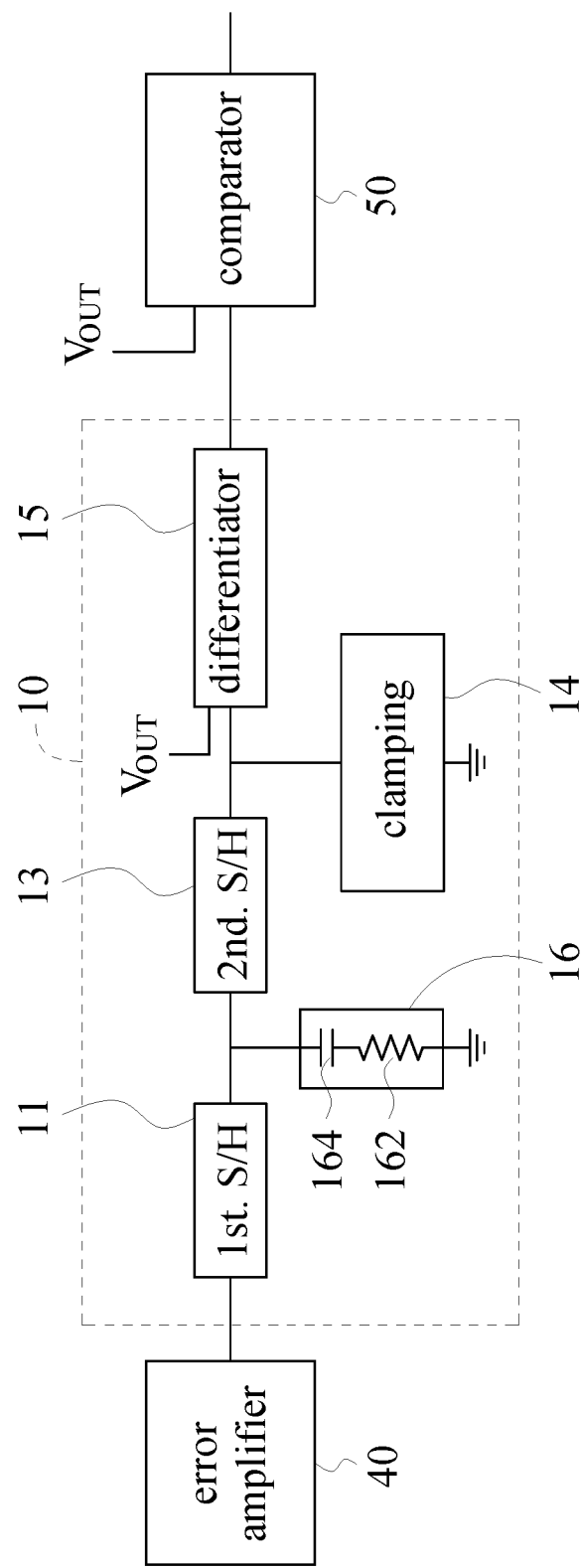
FIG. 10 is a block diagram of the transient enhancing circuit according to yet another embodiment of the present invention.

In a referable embodiment, as shown in FIG. 10, the compensating circuit 16 may include a resistor 162 and a capacitor 164 coupled in series between the output terminal of the first sample-and-hold circuit 11 and the ground. However, the order of coupling the resistor 162 and the capacitor 164 is not meant to be a limitation of the present invention. Those skilled in the art may use either design interchangeably without departing the spirit of the present invention.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A transient enhancing circuit for a constant-on-time converter, the constant-on-time converter comprising an error amplifier and a comparator, the transient enhancing circuit comprising:
   a first sample-and-hold circuit having an input terminal and an output terminal, wherein the input terminal of the first sample-and-hold circuit is coupled to an output terminal of the error amplifier, and the output terminal of the first sample-and-hold circuit is coupled to a first input terminal of the comparator;
   a zero-current detection circuit coupled to the first sample-and-hold circuit,
   wherein the zero-current detection circuit is arranged for outputting a control signal when current flowing through a load coupled to the constant-on-time converter is detected to be zero;
   a second sample-and-hold circuit having an input terminal and an output terminal, wherein the input terminal of the second sample-and-hold circuit is coupled to the output terminal of the first sample-and-hold circuit, and the output terminal of the second sample-and-hold circuit is coupled to the first input terminal of the comparator; and a clamping circuit having a first terminal and the second terminal, wherein the first terminal of the clamping circuit is coupled to the output terminal of the second sample-and-hold circuit and the second terminal of the clamping circuit is coupled to the ground, wherein the zero-current detection circuit is coupled to second sample-and-hold circuit.

2. The transient enhancing circuit of claim 1, further comprising:

a compensating circuit coupled between the output terminal of the first sample-and-hold circuit and the ground.

3. The transient enhancing circuit of claim 2, wherein the compensating circuit comprises:

a resistor; and a capacitor, wherein the resistor and the capacitor are coupled in series between the output terminal of the first sample-and-hold circuit and the ground.

4. The transient enhancing circuit of claim 1, wherein the second sample-and-hold circuit comprises:

a second switch coupled between the input terminal and the output terminal of the second sample-and-hold circuit; and a second capacitor coupled between the input terminal of the second sample-and-hold circuit and the ground, wherein the second switch is opened in response to the control signal during each duty cycle.

5. The transient enhancing circuit of claim 1, wherein the second sample-and-hold circuit is arranged to hold a sampled voltage level of the error voltage outputted from the error amplifier and then clamped by the clamping circuit in response to the control signal.

6. The transient enhancing circuit of claim 1, further comprising:

a differentiator having an input terminal and an output terminal, wherein the input terminal of the differentiator is coupled to the output terminal of the second sample-and-hold circuit, and the output terminal of the differentiator is coupled to the first input terminal of the comparator.

7. The transient enhancing circuit of claim 1, wherein the clamping circuit comprises:

a plurality of diodes coupled in series between the first terminal of the clamping circuit and the second terminal of the clamping circuit.

8. The transient enhancing circuit of claim 1, wherein the first sample-and-hold circuit comprises:

a first switch coupled between the input terminal and the output terminal of the first sample-and-hold circuit; and a first capacitor coupled between the output terminal of the first sample-and-hold circuit and the ground, wherein the first switch is opened in response to the control signal during each duty cycle.

9. The transient enhancing circuit of claim 1, wherein the first sample-and-hold circuit is arranged to hold a sampled voltage level of an error voltage outputted from the error amplifier in response to the control signal.

10. A constant-on-time converter, comprising:

an error amplifier having a first input terminal, a second input terminal and an output terminal, wherein the second input terminal is coupled to a reference voltage;

a comparator having a first input terminal, a second input terminal and an output terminal;

a buck converter, having an input terminal and an output terminal, wherein the output terminal of the buck converter is coupled to the first input terminal of the error amplifier, to the second input terminal of the comparator, and to a load;

a constant-on-time controller coupled between the input terminal of the buck converter and the output terminal of the comparator;

a transient enhancing circuit, comprising:

a first sample-and-hold circuit having an input terminal and an output terminal, wherein the input terminal of the first sample-and-hold circuit is coupled to an output terminal of the error amplifier and the output terminal of the first sample-and-hold circuit is coupled to the first input terminal of the comparator;

a zero-current detection circuit coupled to the first sample-and-hold circuit, wherein the zero-current detection circuit is arranged for outputting a control signal when current flowing through the load coupled to the constant-on-time converter is detected to be zero;

a second sample-and-hold circuit having an input terminal and an output terminal, wherein the input terminal of the second sample-and-hold circuit is coupled to the output terminal of the first sample-and-hold circuit, and the output terminal of the second sample-and-hold circuit is coupled to the first input terminal of the comparator; and a clamping circuit coupled between the output terminal of the second sample-and-hold circuit and the ground, wherein the zero-current detection circuit is coupled to the second sample-and-hold circuit.

11. The constant-on-time converter of claim 10, wherein the clamping circuit comprises:

a plurality of diodes coupled in series.

12. The constant-on-time converter of claim 11, further comprising:

a differentiator having an input terminal and an output terminal, wherein the input terminal of the differentiator is coupled to the output terminal of the second sample-and-hold circuit, and the output terminal of the differentiator is coupled to the first input terminal of the comparator.

13. The constant-on-time converter of claim 10, further comprising:

a compensating circuit coupled between the output terminal of the first sample-and-hold circuit and the ground.

14. The constant-on-time converter of claim 13, wherein the compensating circuit comprises:

a resistor; and a capacitor, wherein the resistor and the capacitor are coupled in series between the output terminal of the first sample-and-hold circuit and the ground.

15. The constant-on-time converter of claim 10, wherein the second sample-and-hold circuit comprises:

a second switch coupled between the input terminal and the output terminal of the second sample-and-hold circuit; and a second capacitor coupled between the input terminal of the second sample-and-hold circuit and the ground, wherein the second switch is opened in response to the control signal during each duty cycle.

16. The constant-on-time converter of claim 10, wherein the second sample-and-hold circuit is arranged to hold a sampled voltage level of the error voltage outputted from the error amplifier and then clamped by the clamping circuit in response to the control signal.

17. The constant-on-time converter of claim 10, wherein the first sample-and-hold circuit comprises:
   a first switch coupled between the input terminal and the output terminal of the first sample-and-hold circuit; and
   a first capacitor coupled between the output terminal of the first sample-and-hold circuit and the ground,
   wherein the first switch is opened in response to the control signal during each duty cycle.

18. The constant-on-time converter of claim 10, wherein the first sample-and-hold circuit is arranged to hold a sampled voltage level of an error voltage outputted from the error amplifier in response to the control signal.

* * * * *